United States Patent [19]

Wheeler

[11] Patent Number: 4,913,639

[45] Date of Patent: Apr. 3, 1990

[54] COMPOSITE CAUL PLATE

[76] Inventor: Robert G. Wheeler, 3927 Clarence Cir., Corvallis, Oreg. 97330

[21] Appl. No.: 243,890

[22] Filed: Sep. 13, 1988

[51] Int. Cl.⁴ ........................ B29C 43/04; B29C 43/36

[52] U.S. Cl. .................................... 425/193; 100/295; 100/918; 425/385; 425/403; 425/406; 425/DIG. 30

[58] Field of Search ................ 249/140; 425/385, 457, 425/420, 383, 384, 403, 407, 411, DIG. 30, 416, 193, 406; 72/481; 100/295, 918; 101/3 R, 16, 28; 276/40–43; 156/580, 581, 583.1; 264/283

[56] References Cited

U.S. PATENT DOCUMENTS

| | | | |
|---|---|---|---|
| 507,892 | 10/1893 | Dyson | 72/481 |
| 756,652 | 4/1904 | Kern et al. | 425/385 |
| 862,947 | 8/1907 | Uhrig | 101/3 R |
| 951,343 | 3/1910 | Simmang | 101/28 |
| 1,106,564 | 8/1814 | Hoffman | 72/481 |
| 1,372,992 | 3/1921 | Beadle | 425/407 |
| 1,399,817 | 12/1921 | Steventon | 425/385 |
| 1,417,463 | 5/1922 | Edison et al. | 425/385 |
| 1,608,954 | 11/1926 | Pollack | 101/3 R |
| 2,025,518 | 12/1935 | Lewis | 101/3 R |
| 2,378,562 | 6/1945 | Lahr | 403/294 |
| 3,043,167 | 7/1962 | Robbins | 72/481 |
| 3,139,676 | 7/1964 | Grover | 100/918 |
| 3,568,595 | 3/1971 | Bunting | 425/384 |
| 3,761,338 | 9/1973 | Ungar et al. | 264/284 |
| 4,141,944 | 2/1979 | Anstadt et al. | 264/284 |
| 4,179,252 | 12/1979 | Seufert | 425/384 |
| 4,479,841 | 10/1984 | Rappt et al. | 425/193 |
| 4,718,339 | 1/1988 | Wymann | 100/918 |

FOREIGN PATENT DOCUMENTS

| | | | |
|---|---|---|---|
| 0220652 | 3/1959 | Australia | 403/294 |
| 0048189 | 12/1932 | Denmark | 403/294 |
| 0501611 | 6/1930 | Fed. Rep. of Germany | 101/3 R |
| 1811010 | 3/1970 | Fed. Rep. of Germany | 403/294 |
| 2723848 | 12/1978 | Fed. Rep. of Germany | 425/193 |
| 460921 | 4/1975 | U.S.S.R. | 100/295 |
| 502806 | 3/1939 | United Kingdom | 425/193 |
| 0511239 | 8/1939 | United Kingdom | 425/385 |

*Primary Examiner*—Willard Hoag
*Attorney, Agent, or Firm*—Dellett, Smith-Hill & Bedell

[57] ABSTRACT

A composite caul plate includes a replaceable insert plate bearing a wood-grain pattern. The insert plate is inexpensive to manufacture and easy to mount to the caul plate. The insert plate is secured in position by means of rib elements having formations for retaining the insert plate against a base plate.

21 Claims, 4 Drawing Sheets

FIG. 8
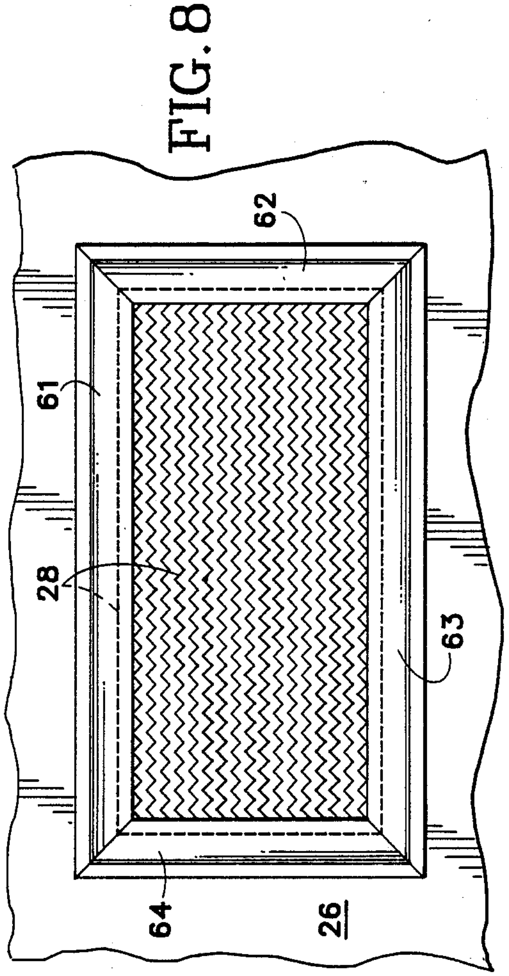
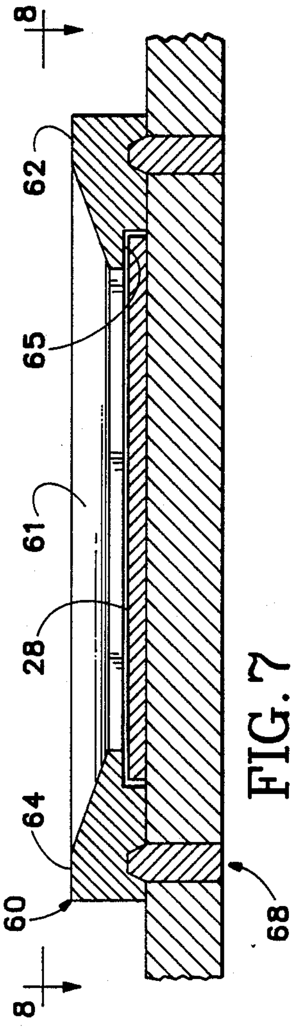
FIG. 7

COMPOSITE CAUL PLATE

BACKGROUND OF THE INVENTION

The present invention relates to caul plates for the manufacture of rigid wood products by compression of coarse wood particles.

Textured caul plates having a wood-grain pattern have heretofore been photoengraved or etched in a costly manufacturing process. An example of photoengraving as applied to caul plates is described in U.S. Pat. No. 4,544,440. A blank caul plate element is suitably coated with a photosensitive etchant resist and a wood grain pattern is projected by ultraviolet light upon the resist so as to alter the solubility of portions thereof. The blank is immersed in acid and the wood grain pattern if formed at the surface of the blank. In a second example of an etching process, a blank caul plate receives a coating of etchant resist and a small roll engaging the blank carries a stainless steel matrix upon its outer periphery, the matrix having a hand carved wood-grain pattern upon its exposed surface. The roll contacts the blank and rotates to wear down the resist material and expose portions of the blank so as to transfer the wood-grain pattern. The blank is immersed in acid to erode portions of the blank no longer protected by the resist material and transfer the wood-grain pattern to the surface of the blank. Manufacturing costs associated with etching process can exceed eight thousand dollars per caul plate and the caul plate is susceptible to damage in use. In addition to the manufacturing expense and risk of damage, such caul plates usually carry but one pattern and require remounting when a different pattern is desired.

SUMMARY OF THE INVENTION

In a principal embodiment of the present invention, a composite caul plate utilized to compress a board assembly of coarse wood products and cellulosic fibers into a rigid wood product includes a base plate with raised rib elements mounted thereon and including formations for retaining thin embossed insert plates in face-to-face abutment with the base plate. The rib elements and insert plates together provide a decorative pattern which, when applied to the board assembly under compression, result in a corresponding decorative pattern upon the surface of the completed rigid wood product. The insert plates are inexpensive to produce and easy to mount to the compositive caul plate. Damage to the composite caul plate is normally limited to the insert which is less costly to replace than the whole plate.

It is an object of the present invention to provide an improved and inexpensive caul plate which is less susceptible to costly damage than caul plates heretofore available.

It is another object of the present invention to provide an improved caul plate adapted to provide a variety of decorative patterns without extensive re-mount procedures.

DRAWINGS

FIG. 7 is a cross-sectional side view of a second composite caul plate according to the present invention; and FIG. 8 is a top view of the composite caul plate of FIG. 7 taken along lines 8—8 of FIG. 7.

DETAILED DESCRIPTION

Figure 1:
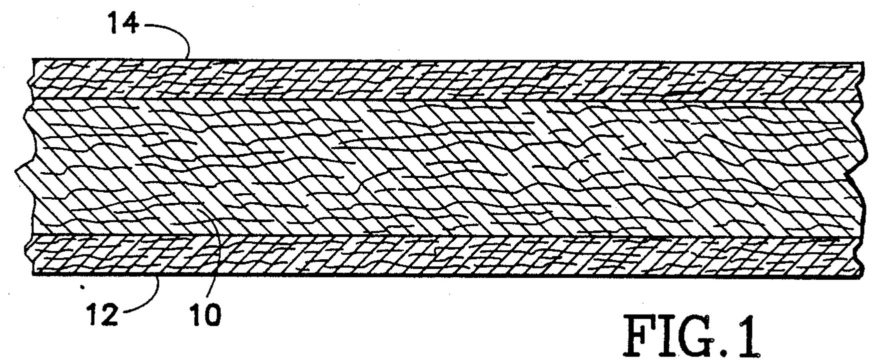
FIG. 1 is a cross-sectional view, partially broken away, of an assembly of coarse wood components between cellulosic fiber webs, from which a rigid board product is manufactured.

Referring to FIG. 1, a rigid board product is formed from an assembly or sandwich comprising a core 10 of fairly coarse wood particles between two wet blankets or webs 12 and 14 consisting of interlaced cellulosic fibers. The wood particles may comprise wood waste material such as planer shavings, veneer flakes, or the like, and are mixed with a suitable adhesive such as phenolic resin. The wood particles are dried, e.g. having a moisture content of about 8 to 15 percent. The wood particles may be deposited to a depth of about 4 inches for subsequently resulting in a ¾-inch board product. The adhesive should be one which sets or cures after having been subjected to heat and pressure in the presence of steam, and should be one which will not be excessively absorbed into the wood particles. The webs 12 and 14 are each typically on the order of one-thirty-second to one-sixteenth inch in thickness, and are preferably cellulosic pulp such as wood pulp. In preparing each web, a slurry is provided of the proper consistency for suction formation, and the web may be formed on a suction head or cylinder having a pulp screen of the desired size. The resulting web is about 50 percent water. The board assembly illustrated in FIG. 1 may be manufactured by first laying down a web 12 of cellulosic fiber, depositing the wood particles thereupon, and completing the assembly with the second web 14. The assembly of FIG. 1 is suitably formed into a rigid board product employing a press as illustrated in FIG. 2.

Figure 2:
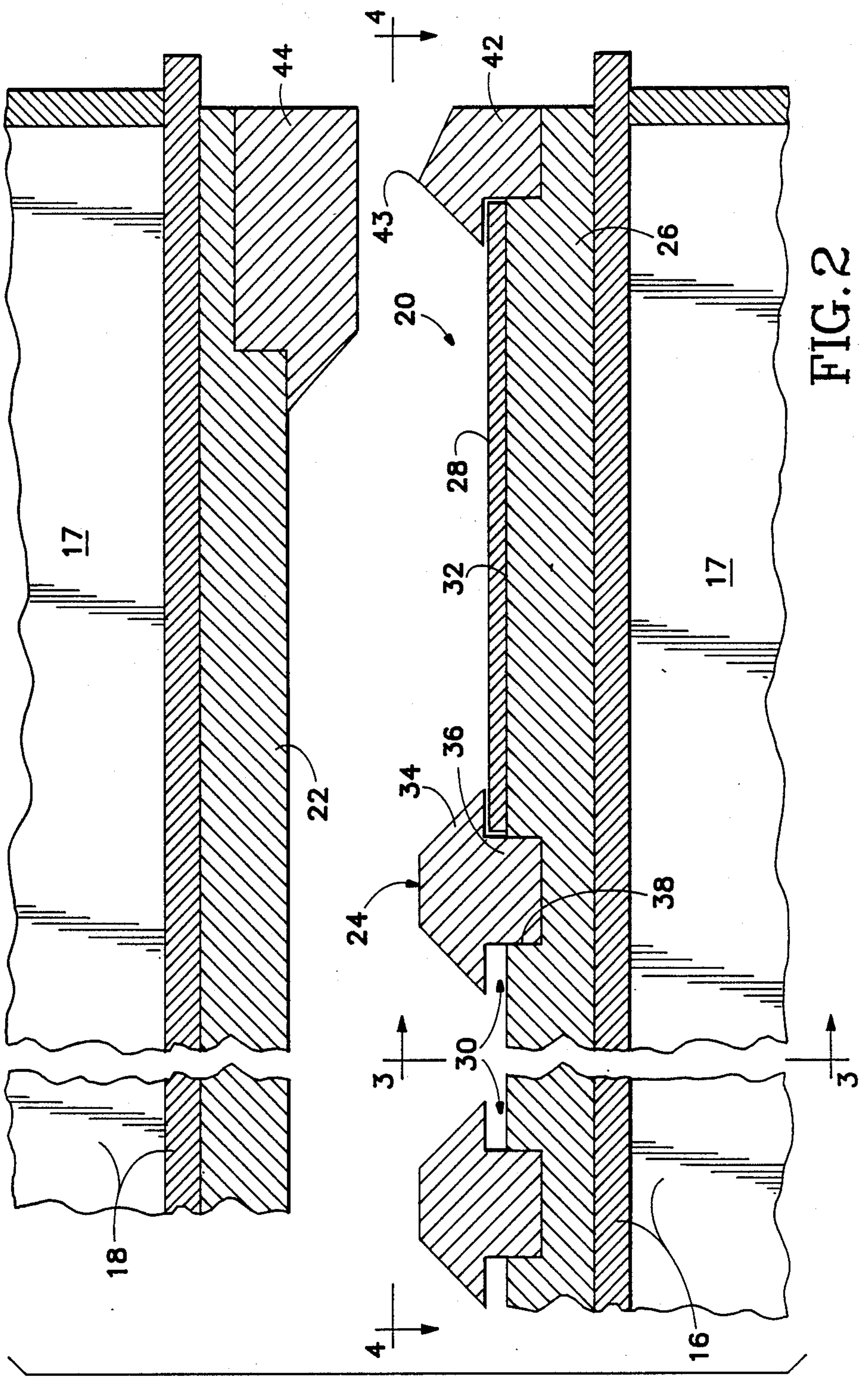
FIG. 2 is a cross-sectional view, partially broken away, of a portion of a press including a composite caul plate in accordance with the present invention.

Referring to FIG. 2, the press apparatus comprises a pair of parallel hollow platens 16 and 18. The assembly of wood particles 10 and cellulose fiber webs 12 and 14 compressed between the platens 16 and 18 to complete the rigid wood product. Hot gas, such as hot air or steam, is introduced into hollow regions 17 of plates 16 and 18 for heating the assembly 10 and cellulosic fiber webs 12 and 14 to an elevated temperature. Such temperature should be higher than the boiling point of water whereby steam is provided from the moisture in core 10 of the assembly; however, such temperature should be below the charring point of paper in order that webs 12 and 14 will not become charred. The temperature is desirably between 275° and 325° F.

Between the press platens are metal caul plates 20 and 22 which contact the board assembly of FIG. 1 therebetween, the upper plate 22 being secured to the upper press platen 18 by conventional means (not shown). The upper caul plate 22 may be omitted, if desired. Lower caul plate 20 is secured to platen 16 by conventional means (not shown) and the board assembly of FIG. 1 may be initially deposited upon lower caul plate 20 prior to the insertion of the same into the press apparatus. It is understood that the assembly of FIG. 2 may be reversed whereby lower caul plate 20 may be secured to upper platen 18 and upper caul plate 22 may be secured to lower platen 16 in which case the board assembly of FIG. 1 would initially be deposited upon caul plate 22.

Figure 3:
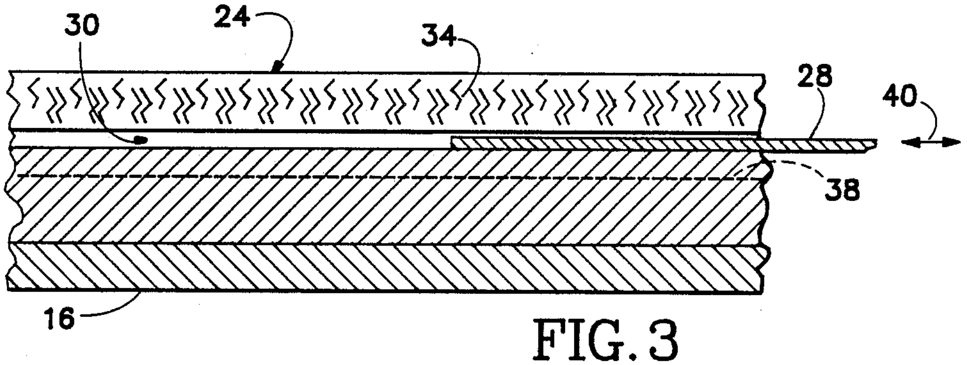
FIG. 3 is a cross-sectional view of the composite caul plate of FIG. 2 taken along lines 3—3 of FIG. 2.
Figure 4:
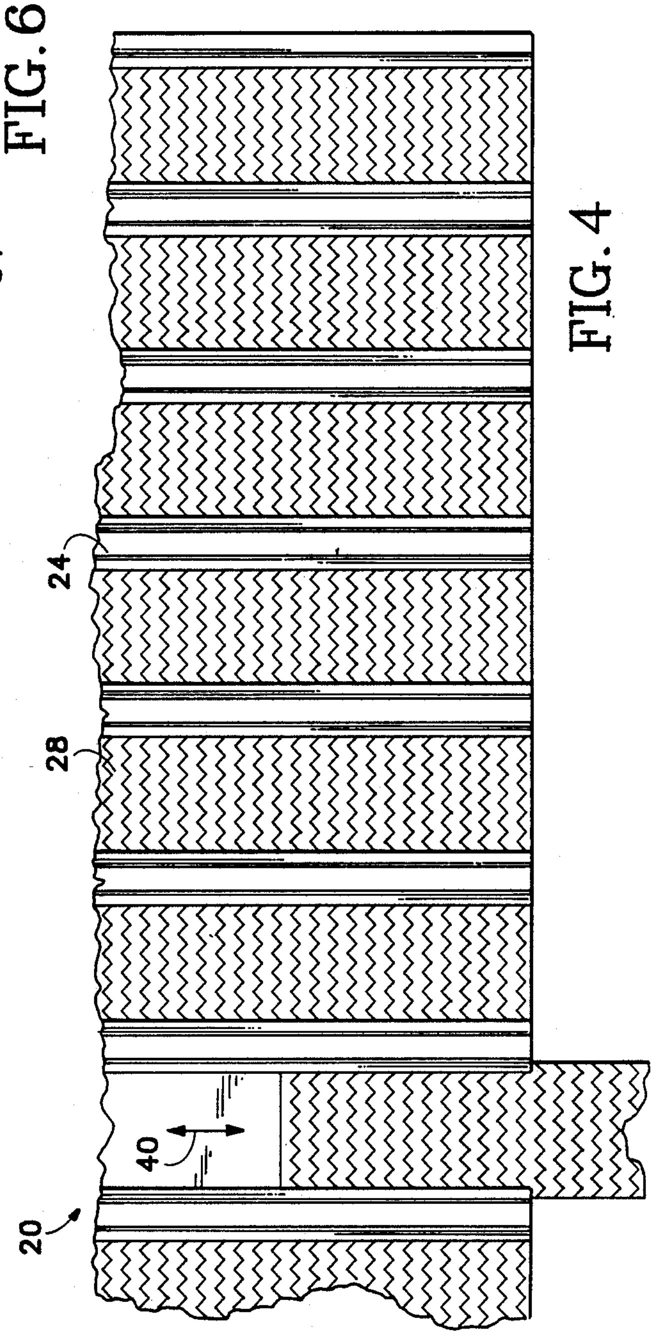
FIG. 4 is a top view partially broken away of the composite caul plate of FIG. 2 taken along lines 4—4 of FIG. 2.

Referring now to FIGS. 3 and 4 in conjunction with FIG. 2, lower caul plate 20 is suitably a composite structure including rib elements 24, base plate 26 and embossed insert plates 28 according to the present invention. Base plate 26 is attached (by means not shown) directly to platen 16. Rib elements 24, a function of which is to form grooves or the like in the finished wood product, mount in parallel spaced relation upon base plate 26 while slot formations 30 slidably receive insert plates 28 and retain plates 28 in face-to-face abutment with base plate 26.

Each rib element 24 has a cross-sectional area including an upper trapezoidal portion 34 and a smaller lower rectangular portion 36. The base of trapezoid portion 34 is adjacent to and wider than rectangular portion 36. Rectangular portion 36 is secured (by means not shown) within a groove 38 formed in base plate 26. The depth of groove 38 is less than the height of rectangular portion 36 such that portion 36 is partially inserted within groove 38 to leave a space between the base of trapezoid portion 24 and face 32 of base plate 26. In this manner, slot formations 30 are provided on each side of rib elements 24 and are suitably dimensioned to slidably receive insert plates 28 between adjacent rib elements 24 and thereby retain insert plates 28 against the base plate. FIGS. 3 and 4 illustrate one of insert plates 28 partially inserted within slot formation 30 and arrows 40 indicate the directions in which insert plates 28 slide. It is understood that other rib element configurations, such as a groove in each side of rib elements 24, can serve the same slidable retention function as formations 30 for closely receiving the insert plates. A decorative pattern may be applied to the exposed surfaces of trapezoid portion 34 by means of a dulled planar blade as set forth in U.S. Pat. No. 3,474,706.

The press illustrated in FIG. 2 may be further provided with lower insert 42 secured to base plate 26 and upper insert 44 secured to upper caul plate 22 by conventional means (not shown). Although not shown in FIG. 2, it is understood that inserts similar to inserts 42 and 44 may be supplied at the opposite or left-hand side of the press with the latter inserts being reversed in form whereby a right-hand and a left-hand margin will extend from each edge of the finished board, making possible a ship-lapped construction as taught in U.S. Pat. No. 3,661,688. If the upper caul plate 22 is omitted, insert 44 attaches directly to the edge portion of the lower surface of the upper platen 18. Inserts 42 and 44 are suitably constructed of the same metal as the unit to which they attach.

Figure 5:
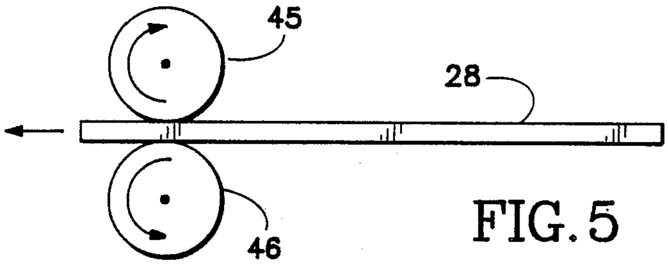
FIG. 5 illustrates a method of embossing a pattern upon an insert plate of the composite caul plate of FIG. 2.

Each insert plate 28 is formed of a relatively thin mild steel, stainless steel or aluminum sheet with a decorative pattern thereon, typically a wood grain pattern. The pattern could be formed by several methods including photo-engraving and etching; however, such expensive processes are not required. Although base plate 26 is similar in thickness to a conventional caul plate, insert plates 28 are much thinner than a conventional caul plate and may be provided with a wood-grain pattern or the like at far less cost. FIG. 5 illustrates a preferred method of embossing insert plates 28 including feeding said plates between press rollers 45 and 46. Each of rollers 45 and 46 carries a matching wood-grain type pattern wherein a concave portion of roller 45 corresponds to a convex portion on roller 46. These matching patterns can be formed by using the same original pattern on each roller but a negative etching or carving process on one roller and a positive etching or carving process on the other. Rollers 45 and 46 are positioned to align each pattern with respect to the other as the rollers concurrently rotate. The wood-grain type pattern on rollers 45 and 46 is transferred to insert plate 28 as plate 28 passes between rollers 45 and 46, with the rollers closely spaced to indent the plate. Rollers 45 and 46 may be used to produce a great number of insert plates 28 and the cost of producing each insert plate 28 in this manner is approximately forty dollars.

Insert plates 28 may be fastened to a base plate 26 by rivet, screw, plug weld and the like. In the case of an aluminum insert plate 28, having a relatively greater expansion and contraction response to heating than base plate 26, it has been found advantageous to fasten each aluminum insert plate 28 at one point to permit expansion and contraction without buckling. In general, the base plate provides very adequate support for the inserts, providing the strength for the inserts, while the inserts provide the pattern.

The assembly 10, 12, 14 is compressed between the press platens at a pressure suitably between 30 and 150 p.s.i. for a period typically between about 10 and 30 minutes, depending upon moisture content and the like. The heat from the platens transforms the moisture in the wood and webs into steam which escapes through the interstices between the wood particles. After several minutes of moist heat, the wood particles are softened sufficiently that the fibers thereof will slip with respect to one another under pressure, permitting the mass to settle to the desired thickness. Most of the action involving softening of the particles, adjustment of the particles into close conformity with one another, relieving stresses in the core, and curing most of the adhesive, is accomplished in about 5 to 15 minutes. The remaining time that the assembly remains in the press is desirable to drive out almost all the moisture and reduce the resulting board to a substantially bone-dry state, say, for example, 2 to 3 percent moisture content, to completely cure all the adhesive throughout the board, and to drive all of the steam out so that when pressure is released, surfaces of the board will not come apart. Spacer jibs or blocks (not shown) may be disposed at the edges of the press platens for blocking the platens apart when the desired final thickness for the composite board product is reached.

Figure 6B:
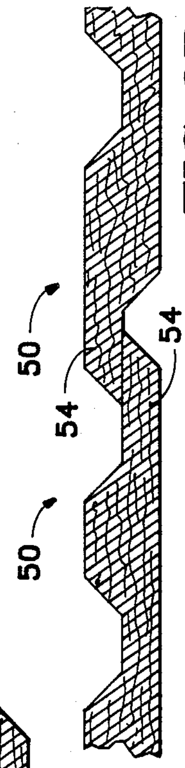
FIGS. 6A and 6B are end views of rigid wood products produced by the composite caul plate of FIG. 2.
Figure 6A:
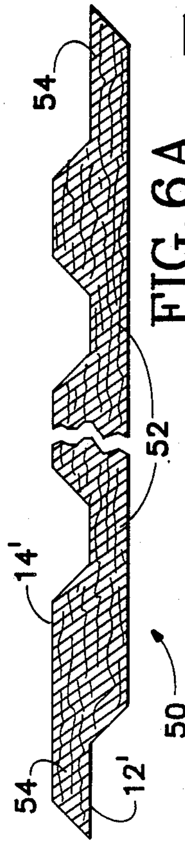

The assembly 10, 12, 14 is reduced to the rigid board product 50 shown in cross-section in FIGS. 6A and 6B having a thickness of between $\frac{3}{8}$ inch and 1 inch as a result of the heat and pressure applied by the composite caul plate of FIG. 2. The density of core 50' is on the order of 30 to 50 pounds per cubic foot with dense, tough skins 12' and 14' of compacted cellulosic fibers resulting from the webs 12 and 14, respectively, on either side of the core of consolidated wood particles. These skins of cellulosic fibers are interlocked with the irregular surfaces of the core 10 formed by the particles. The density of the board product; except for specific portions thereof described hereinafter, is such that it may be characterized as medium density board. Portions 52 of product 50 are of higher density due to the additional compression provided by rib elements 24 while margins 54 are more dense due to inserts 42 and 44. As taught in U.S. Pat. No. 3,661,688, board 50 is trimmed along margin 54 at a line corresponding to edge 43 (FIG. 2) of insert 42. Densified margin 54 thereby serves to protect the inner core from moisture. FIG. 6B illustrates how two board products 50 may be joined in a ship-lapped fashion for use as exterior siding or the like. The cellulosic fiber skins cooperate readily with the caul plate inserts according to the present invention to receive the transferred pattern without entering edges of slot formations 30 as might be the case if a board were to be formed from wood particles without the skins.

The present invention may be applied to other types of caul plates such as the type disclosed in U.S. Pat. No. 4,544,440 wherein individual caul inserts are separately manufactured and secured to the surface of a base plate. The individual caul inserts generally take the form of a frame enclosing a wood-grain patterned surface and are dimensioned to fit together when plug welded to a base plate. FIGS. 7 and 8 illustrate a caul plate of the type described and shown in U.S. Pat. No. 4,544,440, but manufactured in accordance with the present invention. In FIGS. 7 and 8, frame 60 comprises four ribs 61, 62, 63 and 64 each having a slot formation 65 for retaining insert plate 28 in face-to-face abutment with base plate 26 when frame 60 is secured by plug welds 68 or the like to plate 26. The assembly as shown in FIGS. 7 and 8 is an individual caul plate as described in U.S. Pat. No. 4,544,440 which may then be mounted by rivet, plug weld, screw or the like, to base plate 26 along with other individual caul plates to form an overall decorative pattern.

Thus, an improved caul plate has been shown which is less susceptible to costly repair and which may be easily replaced without complete disassembly of the press apparatus.

I claim:

1. A caul plate for impressing a wood product, said caul plate comprising:

a base plate;

an insert plate, the insert plate being thin with respect to the base plate; and means for retention of said insert plate in face-to-face abutment with said base plate, said retention means including slot formations, said retention means including generally parallel rib members disposed in slot formations defined in the base plate and overlapping edges of the insert plate.

2. A caul plate according to claim 1, wherein said insert plate includes an embossed decorative pattern.

3. A caul plate according to claim 1, wherein said retention means comprises at least two of said rib members.

4. A caul plate according to claim 3, wherein said rib members affixed to said base plate in spaced relation and said retention means formations are adapted for slidably receiving said insert plate.

5. A caul plate comprising:

a base plate having a front face;

an insert plate having a front face and a back face, the insert plate being thin with respect to the base plate; and a plurality of rib elements affixed to said base plate, said rib elements including formations for retaining the back face of said insert plate in face-to-face abutment with the front face of said base plate, wherein said rib elements are generally parallel, disposed in grooves in the base plate, and overlap edges of the insert plate.

6. A caul plate according to claim 5, wherein at least two of said rib elements are affixed to said base plate in spaced relation and said formations are adapted for slidably receiving said insert plate.

7. A caul plate according to claim 5, wherein two more rib elements are provided, said rib elements are interconnected to form a frame enclosing said insert plate, and said formations are adapted to capture said insert plate, when said rib elements forming said frame are affixed to said base plate.

8. A caul plate according to claim 5, wherein said insert plate includes an embossed decorative pattern on its front face.

9. A caul plate according to claim 5, wherein said formations provide slots along the length of said rib elements, the width of the slots being substantially equal to the thickness of said insert plate.

10. A press apparatus for the assembly of wood particles and cellulosic fiber webs into a rigid board product, the apparatus comprising:

a first press platen having a front face;

a second press platen having a front face, the front face of said second press platen being in face-to-face relation with the front face of said first press platen;

a base plate interposed between said first and second press platens, said base plate having a front face and a back face, the back face of said base plate being held against the front face of said first press platen;

an insert plate having a front face and a back face, the insert plate being thin with respect to said base plate; and a plurality of rib elements affixed to said base plate, said rib elements including formations for retaining the back face of said insert plate in face-to-face abutment with the front face of said base plate, wherein said rib elements are generally parallel, disposed in grooves in said base plate, and overlap edges of the insert plate.

11. A press apparatus according to claim 10, wherein said rib elements are affixed to said base plate in spaced relation and said formations are adapted for slidably receiving said insert plate.

12. A press apparatus according to claim 10, wherein said insert plate includes an embossed decorative pattern on its front face.

13. A press apparatus according to claim 10 wherein said insert plate is an embossed member.

14. In a press apparatus for impressing a wood product, the improvement comprising:

a hollow platen;

means for introducing heat energy into said hollow platen;

a caul plate attached to said platen;

an insert plate, the insert plate being thin with respect to said caul plate and being formable to receive an embossed pattern; and means for retention of said insert plate in face-to-face abutment with said caul plate, said retention means defining slot formations, said retention means including generally parallel clamping means affixed to said caul plate and overlapping edges of the insert plate.

15. A press apparatus according to claim 14 wherein said clamping means comprise at least two rib elements affixed to said caul plate and having said slot formations for retaining said insert plate.

16. A press apparatus accoding to claim 15 wherein said rib elements are affixed to said caul plate in spaced parallel relation and said formations are adapted for slidably receiving said insert plate.

17. A caul plate for impressing a wood product, said caul plate comprising:

a base plate;

an insert plate, the insert plate being thin with respect to the base plate; and means for retention of said insert plate in face-to-face abutment with said base plate, said retention means including slot formations, wherein said retention means comprises at least four rib elements affixed to said base plate and having said slot formations for retaining said insert plate, and wherein said rib elements are interconnected to form a frame enclosing said insert plate, said formations being adapted to capture said insert plate when said rib elements forming said frame are affixed to said base plate.

18. A caul plate comprising:

a base plate having a front face;

an insert plate having a front face and a back face, the insert plate being thin with respect to the base plate; and a plurality of rib elements affixed to said base plate, said rib elements including formations for retaining the back face of said insert plate in face-to-face abutment with the front face of said base plate, wherein said rib elements include a decorative pattern.

19. A press apparatus for the assembly of wood particles and cellulosic fiber webs into a rigid board product, the apparatus comprising:

a first press platen having a front face;

a second press platen having a front face, the front face of said second press platen being in face-to-face relation with the front face of said press platen;

a base plate interposed between said first and second press platens, said base plate having a front face and a back face, the back face of said base plate being held against the front face of said first press platen;

an insert plate having a front face and a back face, the insert plate being thin with respect to said base plate; and a plurality of rib elements affixed to said base plate, said rib elements including formations for retaining the back face of said insert plate in face-to-face abutment with the front face of said base plate, wherein at least four of said rib elements are provided, said rib elements are interconnected to form a frame enclosing said insert plate, and said formations are adapted to capture said insert plate when said rib elements forming said frame are affixed to said base plate.

20. A press apparatus for the assembly of wood particles and cellulosic fiber webs into a rigid board product, the apparatus comprising:

a first press platen having a front face;

a second press platen having a front face, the front face of said second press platen being in face-to-face relation with the front face of said first press platen;

a base plate interposed between said first and second press platens, said base plate having a front face and a back face, the back face of said base plate being held against the front face of said first press platen;

an insert plate having a front face and a back face, the insert plate being thin with respect to said base plate; and a plurality of rib elements affixed to said base plate, said rib elements including formations for retaining the back face of said insert plate in face-to-face abutment with the front face of said base plate, wherein said rib elements include a decorative pattern.

21. A press apparatus for the assembly of wood particles and cellulosic fiber webs into a rigid board product, the apparatus comprising:

a first press platen having a front face;

a second press platen having a front face, the front face of said second press platen being in face-to-face relation with the front face of said first press platen;

a base plate interposed between said first and second press platens, said base plate having a front face and a back face, the back face of said base plate being held against the front face of said press platen;

an insert plate having a front face and a back face, the insert plate being thin with respect to said base plate; and a plurality of rib elements affixed to said base plate, said rib elements including formations for retaining the back face of said insert plate in face-to face abutment with the front face of said base plate, wherein the formations in said rib elements cooperate with the front face of said base plate to form slots along the length of said rib elements, the width of the slots being substantially equal to the thickness of said insert plate.

* * * * *

UNITED STATES PATENT AND TRADEMARK OFFICE
CERTIFICATE OF CORRECTION

PATENT NO. : 4,913,639

DATED : April 3, 1990

INVENTOR(S) : Robert G. Wheeler

It is certified that error appears in the above-identified patent and that said Letters Patent is hereby corrected as shown below:

Column 1, line 17, delete "if" and substitute --is--.

Column 1, line 50, delete "compositive" and substitute --composite--.

Column 2, line 51, before "compressed" insert --are--.

Column 2, line 53, delete "plates" and substitute --platens--.

Column 5, line 56, "members affixed" should read --members are affixed--.

Column 7, line 40, "said press platen" should read --said first press platen--.

Column 8, lines 39-40, "said press platen" should read --said first press platen--.

Signed and Sealed this

Seventh Day of May, 1991

*Attest:*

HARRY F. MANBECK, JR.

*Attesting Officer*

*Commissioner of Patents and Trademarks*